Feb. 28, 1928.

R. CHILTON

ENGINE STARTER

Filed April 10, 1925     3 Sheets-Sheet 2

1,660,953

INVENTOR
Roland Chilton
BY
ATTORNEY

Feb. 28, 1928.  1,660,953
R. CHILTON
ENGINE STARTER
Filed April 10, 1925    3 Sheets-Sheet 3

INVENTOR
Roland Chilton
BY
ATTORNEY

Patented Feb. 28, 1928.

1,660,953

UNITED STATES PATENT OFFICE.

ROLAND CHILTON, OF KEYPORT, NEW JERSEY, ASSIGNOR, BY MESNE ASSIGNMENTS, TO HEALLY-AEROMARINE BUS COMPANY, INC., A CORPORATION OF NEW YORK.

ENGINE STARTER.

Application filed April 10, 1925. Serial No. 22,225. REISSUED

This invention relates to mechanisms adapted to kinetically store energy for delivery to an operated means at a greater rate than that at which the energy is developed. The energy is stored in a small flywheel which is rotated to a high velocity from a source of power of relatively small output whereupon, by means of suitable gearing, the energy may be transferred to a means to be operated at reduced velocity but at much greater rate, whereby relatively great driving power is exerted. The starting of internal combustion engines is, especially in the large types associated with aircraft, a case where a relatively small energy input as from manual or electric storage battery means is applied, for short periods only, to turn over the engine, which often seriously overtaxes the present available power sources wherein the rate of input and output are the same. By the utilization of kinetic stored energy the energizing of the device is effected at a low power rate over a relatively protracted period as compared to the few seconds over which the same energy is given up to the engine to start the same.

One of the objects of this invention is to deliver to the engine a much greater torque times speed output than the energizing means is capable of, whereby manual cranking, or cranking from a relatively small battery or other storage means, is rendered practicable for even the largest engines.

The present invention embodies the same general scheme of operation as disclosed in my Patent No. 1,561,506 of November 17, 1925, but there is here featured a more compact and improved form of mechanism for carrying out the desired ends. In apparatus of this type, the weight of flywheel needed to store a given amount of energy decreases as the square of the peripheral velocity and high periphery velocities are accordingly used in this invention, involving relatively great gear reductions. In the typical case herein disclosed, a reduction of 120 to 1 is desired and one of the prime features of this invention consists in the use of a special form of planetary gearing disposed concentrically with the flywheel means, whereby the space occupied by the gears is approximately the same as that required for the flywheel. In this way an extremely compact device suitable for mounting on a large variety of engines without developing interference with other engine accessories is provided.

One of the features of my patent above referred to resides in the special form of calibrated clutch which is adapted to slip only at a pre-set load and to always yield at that load regardless of the condition of the clutch surfaces as to coefficient of friction. By this means the maximum torque that can be developed by the starter or that can be impressed upon it as from a backfire, is positively determined and the capacity of the machine and the required strength of its parts are accordingly known within narrow limits. The slipping clutch assemblage disclosed in my patent rotates with certain of the gears, but in the present disclosure, a non-rotating clutch member restrains a normally fixed gear against rotation until overloads are encountered. The friction surfaces in devices of this character are subject to slippage under high loads and with the concentric disposition of the parts featured in this invention, a relatively large diameter of clutch drum can very conveniently be made integral with one of the gears which affords extremely large wearing surfaces and consequently low intensity of pressure, and further contributes towards the compactness which is one of the chief objects of this invention. In conjunction with this non-rotating clutch coil, stationary calibrating springs of special type having adjustments readily accessible from the exterior of the machine are provided.

In coil clutches such as here shown, the friction pressures are much greater at one end of the coil than at the other, due to wrapping action and to avoid uneven wear of the surfaces the coils in this disclosure are made of greater width at the highly loaded end.

The calibration of this clutch is obtained by disposing the friction applying springs to oppose the rotational tendency of the normally fixed gear so that, when this tendency exceeds the spring setting, the coil is released and the gear permitted to rotate, causing the driving mechanism to yield at the pre-set load. It will be seen that wear of the friction surfaces will cause some change from the preadjusted length of the springs, and so tend to reduce the spring pressure and hence the slipping load. It is therefore desirable to provide springs having the smallest practicable load change for a given extension. Spiral springs having the desired characteristics are relatively bulky and experience has shown that they are apt to develop chatter when the coil slips. Springs having some frictional damping characteristic to prevent this chatter are provided in the stacks of annular conical spring disks shown, which type of spring has relatively high load times deflection characteristic per unit volume, and so contributes towards the object of compactness.

The planetary gear arrangement which constitutes one of the features of this invention, is of the general type wherein fixed and driven annuli of only slightly different diameters are engaged by planet pinions. Such planetary gears are characterized by the large reduction obtained in a relatively small space, and for the relatively high strength developed due to the multiplicity of pinions and the large number of teeth in contact between the pinions and annuli. Planetary motion is usually imparted to such gears by driving a cage supporting the planet pinion axes, but in this invention an increased gear reduction and a great reduction in the stresses in the cage are realized by constituting this member to float free of all driving connections and driving the planet pinions by mesh with a centrally located pinion secured to the flywheel.

One of the objects of providing a gear having no driving connections to the planet cage is to avoid difficulty due to misalignment between these members and to this end, in the present invention, the cage is carried exclusively by the pinions and adapts itself freely to the position assumed by them under load. The only load in this floating cage structure is then that due to the twisting tendency imposed upon the planet axles by the offset between the annular gears. Such loads, however, are of considerable magnitude, whilst any yielding of the cage to them would result in misalignment of the planets. Accordingly to avoid possibility of misalignment or distortion the cage is fabricated as a rugged one-piece structure which is one of the features of this invention.

To avoid friction losses, anti-friction bearings are preferred for supporting the pinion spindles in each side of the cage. These spindles slidably engage the bores in the planet hubs which hubs are of proper length to fit between the bearings. These are assembled into the sides of the cage from the inside and fit in shouldered bores so that, upon the introduction of the planet and its spindle, the entire assembly is positively located in all directions without resource to a built-up planet cage or to detachable bearing caps or other bearing locating means.

The extremely high rotational speed of the fly-wheel and its drive pinion renders extreme accuracy of mesh desirable between this pinion and the planets, and this desired accuracy is difficult to achieve by ordinary production methods. Accordingly in this invention the pinion is in floating engagement with the planets which support it without other restraint. The flywheel is supported on a preferably anti-friction bearing substantially under the center of its width so that the pinion may follow any slight misalignment of the other gears without causing binding, such as would result if the pinion and flywheel assemblage were supported by spaced apart bearings.

Another feature of this invention resides in the provision for either axial or transverse operation for energizing the flywheel. The transverse drive is obtained from a driven bevel gear normally meshing with a gear associated with the starting jaw. In addition to the anti-friction bearing in its control sleeve, the starter jaw shaft is supported at the other or rear end in a bushing secured to the starter case, which bushing also conveniently serves to secure the inner race of the flywheel bearing. The starting jaw drive shaft may be prolonged through this sleeve thereby affording a convenient point of attachment for a longitudinally disposed cranking means which is so connected as to be automatically disengaged when the starting jaw is moved to meshed position.

Various other objects and advantages of the invention will be in part obvious from an inspection of the accompanying drawings and a careful consideration of the following particular description and claims of one form of mechanism embodying my invention.

In the drawings:—

In the present instance 10 designates a portion of an engine to which is attached in any suitable manner a starter casing 11 in which is rotatably mounted a flywheel 12 provided with a pinion 13. The flywheel is supported on the bearing 13ª which is disposed substantially central of its width.

Figure 4:
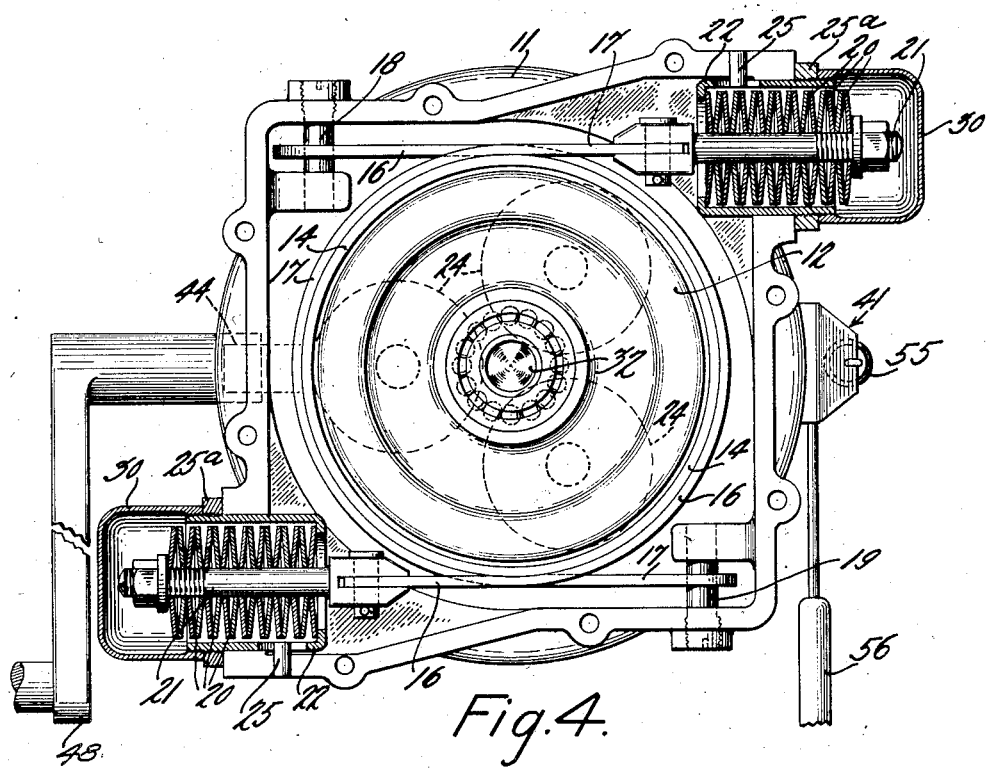
Figure 4 is a right hand end view of Fig. 1 on a reduced scale, and with the cover portion removed.
Figure 5:
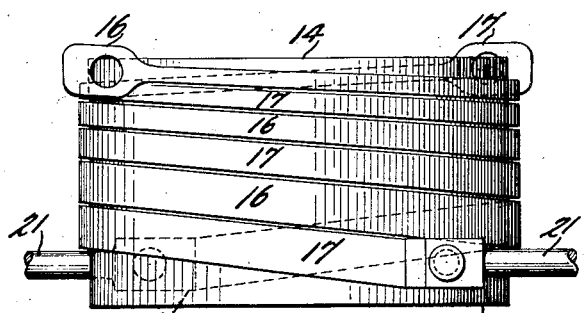
Figure 5 is a detail view of the drum and friction bands on the same scale as Fig. 4.

A friction drum 14 is rotatably mounted so as to partly surround the flywheel 12 and is held in a normally fixed position by a pair of helical friction bands 16, 17 engaging the periphery of the drum. These friction bands are formed tapered for reasons hereinbefore stated, and substantially alike as shown in Fig. 5, and have their relatively narrow ends secured to the studs 18, 19 which are fixed in the casing 11. The larger ends of these bands are individually secured to a calibrated tension device shown in Fig. 4 in which a plurality of conical disk springs 20 are mounted upon a draw bolt 21 which engages the ends of the bands. In suitable openings on opposite sides of the casing 11 there are disposed the spring retaining members 22 which are secured against rotation by the pins 25 and an adjusting nut 25ª is screw-threaded on the retaining member 22 to afford means for the adjustment or calibration of the springs 20 which control the load at which the bands 16, 17 permit the drum to slip. A cap 30 is provided which also serves to lock the nut 25ª in any adjusted position.

The drum 14 is provided at one end with an internal gear 23 which normally constitutes a fixed or sun gear.

A plurality of planet pinions 24 (three being shown in the present instance) each having a lesser and a greater diameter (a) and (b) are rotatably mounted by means of anti-friction bearings 26 in a one-piece floating planet cage 27 which will be more fully described hereinafter. The smaller diameters (a) of the pinions 24 are in mesh with both the flywheel pinion 13 and the normally fixed internal gear 23, whilst the larger diameters (b) of the pinions mesh with a further internal gear 28 of greater diameter which is part of an annular member 29 mounted by means of the splines 31 upon a drive shaft 32 in a manner so as to permit the same to drive the shaft or to be driven thereby.

The drive shaft 32 which is provided at one end with the clutch jaws 33 to engage the engine shaft jaws 34, is rotatably mounted at that point in the bearings 36 and at the other end in a fixed sleeve 37, and an axial bore adapted to pass this drive shaft extends through the pinion cage 27, flywheel pinion 13 and the flywheel 12. It will be seen that the bearing 36 is mounted in a sleeve member 38 which is axially shiftable together with the drive shaft 32 in the nose 39 of the casing 11. This sleeve is actuated in an outward direction by a shifting device 41 which brings about a meshing engagement of the clutch jaws 33 with the engine shaft. This shifting device will also be more fully described hereinafter.

The drive shaft 32 is further provided with a bevel gear 42 which is normally in mesh with a companion gear 43 connected to an operating shaft 44 adapted to be engaged by a crank handle 48.

It will be seen by the construction disclosed, that the axial meshing movement of the drive shaft 32, as above described, will cause the bevel gear 42 to be drawn out of mesh with its companion or cranking gear 43, so that in the event of a backfire the reversed torque will not be transmitted to the operating crank 48.

The control of the jaw 33 for meshing action is through the sleeve 38 which surrounds and supports the jaw through the anti-friction bearing 36. This sleeve is operated by a crank arm 54 of the shifting device 41, said crank arm being designed to slightly pass its dead center position with respect to the travel of the sleeve when the sleeve has retracted the starting jaws to the fully meshed position of the cranking gears. It will be seen that the jaw is thus locked against movement from this position until the shifting device is manipulated by the handle 56, and that no reactions from the cranking gears can reach the operating device.

Figures 1, 2, 3:
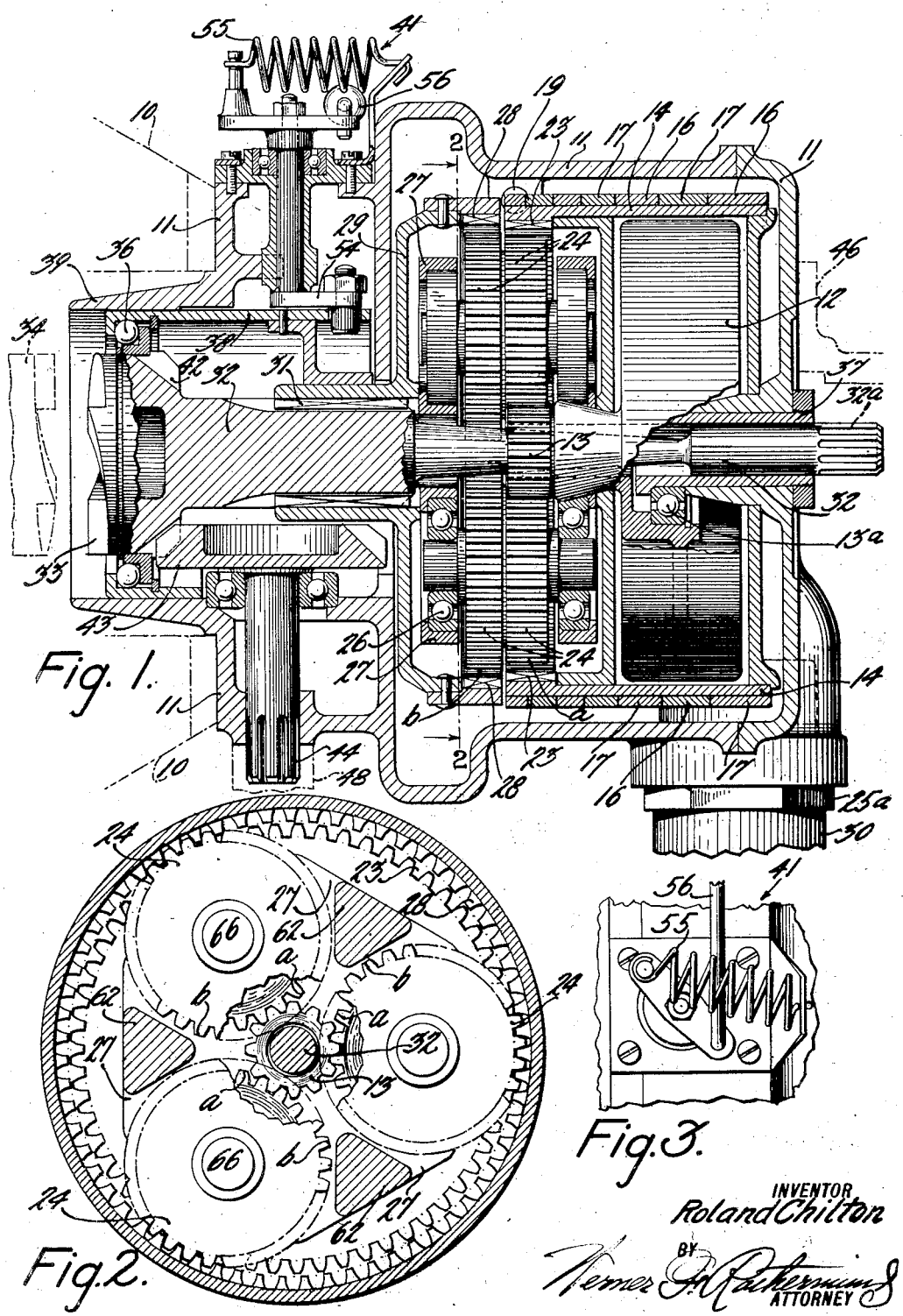
Figure 1 is a horizontal section of the present invention, and shows the pinon bearings sectioned in a plane beyond that of the main portion of the device.
Figure 2 is a cross section taken on the line 2—2 of Fig. 1 looking in the direction indicated by the arrows.
Figure 3 is a detail plan view of a toggle shifting mechanism.
Figure 6:
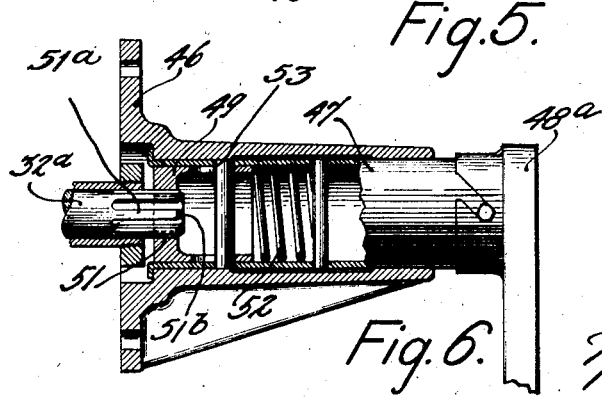
Figure 6 is a detail view of an alternative cranking device.

With reference to Fig. 6 there is shown a cranking device adapted for attachment to the casing 11 (Fig. 1) adjacent the splined smaller end 32ª of the drive shaft 32 when such a location is found more convenient for the operation of the starter. This particular device constitutes a releasing means for the crank handle 48ª and comprises a bracket 46 adapted to form a bearing which should be axially aligned with the drive shaft 32 and secured with screws.

A tubular member 47 is rotatably supported in the bracket 46 and is adapted to be engaged by a crank handle 48ª for rotation therewith. An element 49 is slidably mounted in the member 47 for rotation with the same due to the pin and slot connection 53, said element being provided with splines 51 normally meshing with similarly spaced splines 51ª on the shaft end 32ª, and a spring 52 tends to keep these splines in mesh as shown in Fig. 6.

When the drive shaft 32ª is axially shifted, however, to engage the engine shaft, it is also moved out of engagement with the element 49 thereby releasing the crank handle 48ª. Upon the return of the drive shaft due to the overrunning effect of the engine, the element 49 cannot immediately be reengaged by the shaft, as it is characteristic of a spline connection such as shown, that the splines on meeting end to end cannot interlock whilst the several parts are rotating at relatively different speeds, particularly when the ends of the splines have been chamfered as at 51b. The element 49 will thus be moved axially against the action of the spring 52 and maintained in its retracted position until the rotational speed of the shaft becomes sufficiently low for a reengagement to take place.

Figure 7:
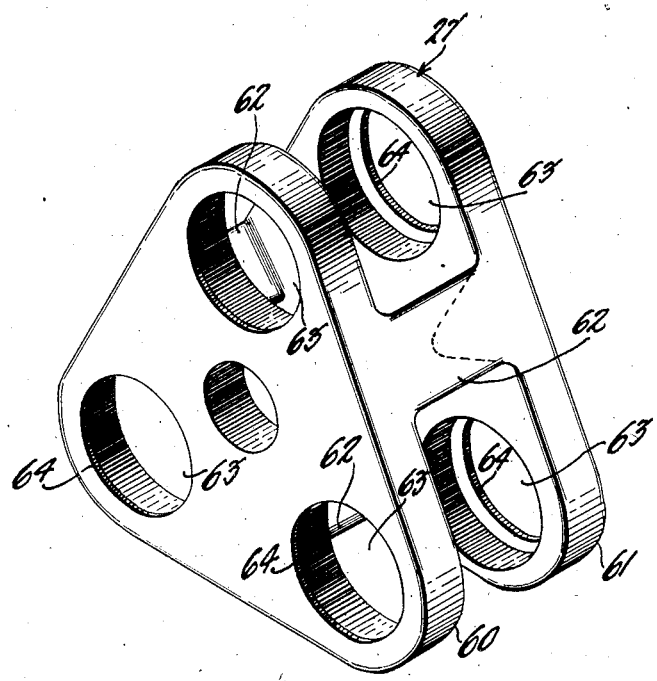
Figure 7 is a perspective view of a one-piece pinion cage.
Figure 8:
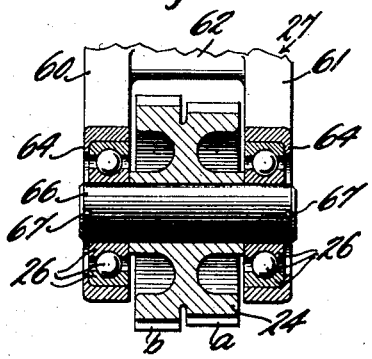
Figure 8 is a fragmentary sectional view of the pinion cage with a pinion mounted therein.

With reference to Figs. 7 and 8 there is shown in detail the pinion cage 27 and the manner of assembling the planet pinions into said cage. The cage is formed of two spaced apart side portions 60, 61 connected by the integral bridge portions 62, and is provided with bores 63 having shoulders 64.

The bearings 26 are first inserted into the bores of the cage so as to engage the shoulders 64. The pinions 24 are then axially aligned with the bearings and the spindles 66 inserted which are secured against axial displacement by cotter pins 67.

The operation of the device is as follows: When it is desired to start the engine, the crank handle 48 or other operating means is set in motion so as to rotate the main drive shaft 32 by means of the operating shaft 44 and the bevel gears 43 and 42. This will cause the annular member 29 provided with the internal gear or driven annuli 28 to rotate and carry with it the planet pinions 24 and the cage 27, it being understood that the other internal gear or normally fixed annuli 32 is being held against rotation by the friction band, 16, 17 engaging the drum 14. Due to the normally fixed state of this annuli, the driven planet pinions will be caused to roll therein, said rolling action imparting to them individual rotational movement which is transmitted to the flywheel 12 through the relatively small pinion 13 at highly increased rate of speed.

The cranking is continued until the flywheel has assumed extremely high velocity. The stored energy of the flywheel will then continue to rotate the drive shaft 32, and when the shifting device 41 is operated the jaws 33 will engage the engine shaft. The energy of the flywheel will be transmitted to the engine at relatively low speed but at great driving power due to the planetary gear transmission.

The axial shifting of the drive shaft into engagement with the engine shaft also causes a demeshing of the bevel gears 32, 43, thus releasing the crank handle. As the fastly rotating flywheel is suddenly connected to the engine which is at rest, excessive resistance would be imposed upon the starter mechanism due to the inertia of the engine mass if some yielding means were not incorporated in the starter gear train. The friction clutch as herein disclosed provides an improved means for this purpose.

It will be understood that when such an overload is imposed upon the mechanism the springs 20, which are set to permit the transmission of a predetermined load, will tend to yield and cause a slight unwinding action of the bands 16, 17 which will permit a slipping of the drum 14. Under the torque generated by this slipping, the engine will be rapidly brought up to the speed corresponding to the speed of the flywheel and thereafter the flywheel and engine will continue to rotate at the relative speeds preset by the planetary gear transmission until such a time as the engine starts or until the kinetic energy in the wheel is exhausted.

When the engine begins to function and overruns the starter the drive shaft 32 will be moved out of engagement with the engine shaft due to the angular construction of the jaws 33 and fully retracted with a snappy action by means of the spring 55 of the shifting device in a manner similar to that of my co-pending application.

In further explanation it might be said that of the two internal gears 23 and 28 either one must be held relatively fixed so as to permit rotation of the other. In other words, when the restraint of the gear 23 caused by the bands 16, 17 exceeds that of the driving effort required to move the engine, the gear 23 will remain stationary and the gear 28 will rotate and drive the shaft 32. On the other hand, should the resistance to rotation of the gear 28 exceed that of the spring and band pressure on the drum the gear 23 will accordingly rotate to the extent of the slipping permitted by the friction bands.

Variations may be resorted to within the scope of the invention and portions of the improvements may be used without the others, whilst not departing from the spirit of the invention.

Having thus described my invention, I claim:

1. In a starter, the combination with an engine to be started, of a flywheel adapted for initial high speed rotation, a gear train having connection with said flywheel and adapted to transmit energy stored in the flywheel by said rotation to the engine, a non-rotatable clutch member having frictional connection with the gear train and adapted to relieve the gear train from an overload.

2. In a starter, the combination with an engine, of a flywheel adapted for initial high speed rotation for the storage of energy wherein, a planetary gear train having connection with said flywheel and adapted to transmit the stored energy of the flywheel to the engine, a load limiting clutch having connection with the gear train and comprising a pair of normally non-rotating friction elements mutually engaged, and a clutch control means normally maintaining the frictional engagement of said elements and adapted to yield at a predetermined load so as to permit the slipping of one of said elements relative to the other.

3. In an engine starter, the combination of a flywheel, an operating means therefor, a pinion on the flywheel, a planetary gear drive transmitting means meshing with the pinion and comprising an annular gear, a control means adapted to restrain the rotation of said gear until a load is encountered which is in excess of a predetermined maximum, an annular driven gear axially aligned with the first said annular gear, planet pinions disposed within and drivably engaging both of said gears, bearings in which said pinions are rotatably mounted, a rigid cage in which the bearings are disposed; said cage being solely supported by said pinions, and a shiftable driven clutch to engage an engine.

4. In an engine starter, the combination of an inertia member, an operating means therefor, a driven means to engage an engine for starting, a driving connection between said member and the driven means comprising a pair of co-axial and adjacent annular gears, an adjustable control means to normally restrain one of said gears against rotation, a pinion cage, a plurality of pinions mounted in said cage and engaging both of said annular gears, and a means driven from one of said annular gears adapted to engage an engine to be started.

5. In apparatus of the class described, the combination with an engine, of an inertia member adapted for initial high speed rotation, a planetary gear driving connection between said member and engine including planet pinions having removable spindles, an anti-friction bearing at each end of said spindles, a rigid cage fabricated from one piece of material in which said spindles and bearings are mounted, said cage comprising side portions spaced apart in fixed relation to receive the pinion therebetween, a means adapted to limit the driving effort on the mechanism to within certain predetermined limits, a shiftable meshing member to engage the engine for the rotation thereof, and a means to maintain said member in either a fully meshed or a fully demeshed position.

6. In a starter, the combination with a drivable means to be engaged, of a flywheel, a cranking gear for energizing the flywheel, a drive shaft adapted to engage said drivable means by axial movement of the shaft, and gear teeth on the shaft adapted to be meshed with the cranking gear when the shaft is in an unengaged position and to be demeshed therefrom when the shaft is moved into an engaged position.

7. In an engine starter, the combination of, a flywheel, a clutch to engage an engine, a gear train connecting the flywheel with the clutch, and an overload release device interposed between the flywheel and the clutch comprising a drum, a pair of interspaced helical friction bands engaging the drum and extending tangentially therefrom at opposite ends, means to anchor one end of each band, and a settable spring means adapted to normally exert a friction producing pull upon the other end of each band so as to restrain the rotational tendency of the drum up to a predetermined amount to which the spring means have been set and to permit the drum to slip when this setting is exceeded.

8. In apparatus of the class described, the combination of a flywheel, a gear train having connection with the flywheel, and a load limiting means in said gear train comprising a normally engaged friction means, a stack of dished annular members constituting a tensioning spring means to normally maintain friction producing pressure in said means and an adjusting means to vary the tension of the annular members.

9. In a starter for an engine having a drive shaft jaw, the combination of a flywheel, a pinion secured thereto, a first annular gear, a non-rotating friction means engaging the gear, a second annular gear of slightly different diameter than that of the first said gear, a jaw slidably operable for engagement with the drive shaft jaw and drivably connected to the second gear, all said elements being disposed concentrically with the engine shaft, and planet pinions drivably connecting the annular gears and meshed with the flywheel pinion.

10. In an engine starter, the combination of a flywheel, a reduction gear drive transmission from the flywheel to the engine to be started said transmission including a plurality of planet pinions, a floating cage in which said pinions are rotatably mounted, said cage being constructed of one piece of material comprising spaced apart side members connected by integral bridge portions; said side members being provided with bores in which the pinions are mounted.

11. In an engine starter, the combination of a flywheel, an operating means therefor, a pinion for the flywheel, a planetary gear drive transmitting means meshing with the pinion and comprising an annular gear, a control means adapted to restrain the rotation of said gear under a normal load and to release the same for rotation when an excessive load is encountered, an annular driven gear axially aligned with the first said annular gear, planet pinions disposed within and drivably engaging both of said gears, a means in which the pinions are mounted, and a driven clutch to engage an engine for the starting thereof.

12. In a starter, the combination of a flywheel, a reduction gear drive transmission from the flywheel to a machine to be started, a clutch to engage the machine, a load control means restraining one of the gears in said drive against rotation until an overload occurs.

13. In a device of the class described, the combination of a flywheel, means for accelerating the flywheel to relatively high speed, said means including a planetary gear assemblage adapted to transmit a multiplied torque from the flywheel to an engine to be started, and a friction clutch having a fixed engaging element; said clutch adapted to automatically limit the torque transmitted to a predetermined amount.

14. In a starter of the class described, the combination of a friction drum, a calibrated friction means engaging the drum to normally maintain the same in fixed relation, a flywheel disposed within the drum and adapted for the storage of energy, a drive shaft, and a geared-up drive transmission including planetary pinions disposed within the confines of the friction drum, said drive shaft being adapted to engage an engine for starting and to transmit thereto the energy of the flywheel, said calibrated friction means being adapted to permit a slipping of the drum at a predetermined load.

15. In a device of the class described, the combination of a flywheel adapted for the storage of energy, a friction drum rotatably mounted and of a diameter not less than that of the flywheel, a non-rotating friction means normally engaging the drum to restrain rotation thereof, a calibrated spring means adapted to permit a release of the drum from the friction means at a predetermined load, an axially shiftable drive shaft having means to engage an engine, and a gear train driving connection between said flywheel and said drive shaft, said drum coacting with said friction means and with said spring means to control the driving effort of the flywheel on the drive shaft when engaged.

16. In apparatus of the class described, the combination with a means to be started, of a hand crank, a flywheel, planetary gearing there between adapted for the relatively high speed rotation of the flywheel from the crank and for the low speed driving of the means to be started from said flywheel, a means adapted to limit the driving effort of the flywheel upon the mechanism when a load in excess of a predetermined amount is encountered, said means including a rotatable drum, helical friction means engaging the drum to maintain the same in a normally fixed position, and a calibrated friction producing spring means having connection with the helical means.

17. In a starter of the class described, the combination of a flywheel mounted for rotation, a pinion on the flywheel, a plurality of planet pinions in mesh with said pinion, a floating one-piece cage in which the planet pinions are mounted for rotation, a friction drum, an internal gear on the drum, a further internal gear disposed for rotation adjacent to the drum, and an axially shiftable clutch shaft having a driving connection with the second said internal gear, said planet pinions meshing with both of said gears.

18. In a starter of the class described, the combination of a flywheel mounted for rotation, a pinion on the flywheel, a plurality of planet pinions in mesh with said pinion, a floating one-piece cage in which the planet pinions are mounted for rotation, a friction drum, an internal gear on the drum, a further internal gear disposed for rotation adjacent to the drum, an axially shiftable clutch shaft having a driving connection with the second said internal gear, said planet pinions meshing with both of said gears, a demeshable operating means for the shaft, helical friction means engaging the drum, and calibrated friction producing spring means having connection with the helical means and adapted to coact therewith in restraining the drum against rotation until the load imposed on the mechanism exceeds the spring calibration.

19. In an inertia driving device for a machine to be operated, the combination of, a flywheel, a pinion on the flywheel, an axially shiftable drive shaft having jaws to engage the machine to be operated, a rotatable drum, a plurality of helical friction bands engaging the drum, said bands being tapered in formation, a calibrated spring means comprising a plurality of annular resilient disks conical in formation, said spring means controlling the frictional engagement of the bands on the drum, an internal gear integral with the drum, a further internal gear adjacent to the first said gear and having a splined connection with the drive shaft, a plurality of planet gears in mesh with both of said internal gears and said pinion, a floating planet cage in which the planet gears are mounted for rotation, an operating means to engage the drive shaft for the rotation of the flywheel, and a means to shift the drive shaft into engagement with the machine to be operated.

20. In an engine starting mechanism, the combination of a calibrated friction clutch, a rotatable mass disposed within the friction clutch, and means for accelerating said mass for the storage of energy therein for delivery to an engine, said means including a torque multiplying planetary gear assemblage and a driving means, and said friction clutch being adapted to limit the torque delivered to the engine to less than the torque capacity of the mechanism.

21. In an engine starter, the combination of a low speed axially shiftable drive shaft adapted to engage the engine shaft, a flywheel, a planetary gear assemblage forming a driving connection between the drive shaft and the flywheel, an operating means for the drive shaft, and a calibrated friction clutch including a constrictable member and a drum.

22. In an engine starter, the combination of a flywheel, an axially shiftable drive shaft to engage an engine shaft, a friction drum, helical friction bands engaging the drum, calibrated spring means to control the engaging action of the bands, an internal gear fixed to the drum, a further internal gear adjacent, and of slightly different diameter than, the first said gear and slidably splined to the drive shaft, a plurality of planet gears each having a lesser and a greater diameter respectively in mesh with said internal gears, an anti-friction bearing supporting the flywheel for rotation at substantially the center of its width, a demeshable cranking means for the drive shaft, and a means to axially shift the drive into engagement with an engine to be started, the last said means being also adapted to maintain the drive shaft in a normally disengaged position.

23. In a device of the character described, the combination of a planetary gear drive, a flywheel having connection therewith, an axially shiftable drive shaft adapted to initially drive the flywheel and to be subsequently driven thereby, a clutch on the drive shaft to engage a means to be driven, a cranking means for the drive shaft adapted to be released therefrom when the drive shaft is axially shifted, a yieldable clutch having connection with the gear drive and adatped to control the load to which the device is subjected said clutch including a rotatable drum, an anchored friction band means engaging the drum to normally restrain the same against rotation, and calibrated spring means responsive to a predetermined load to permit a releasing action of the band means.

Signed at Keyport in the county of Monmouth and State of New Jersey this 8th day of April, A. D. 1925.

ROLAND CHILTON.